April 1, 1924.
G. W. PICKARD
1,488,613
VACUOUS ELECTRICAL APPARATUS
Filed Feb. 28, 1919
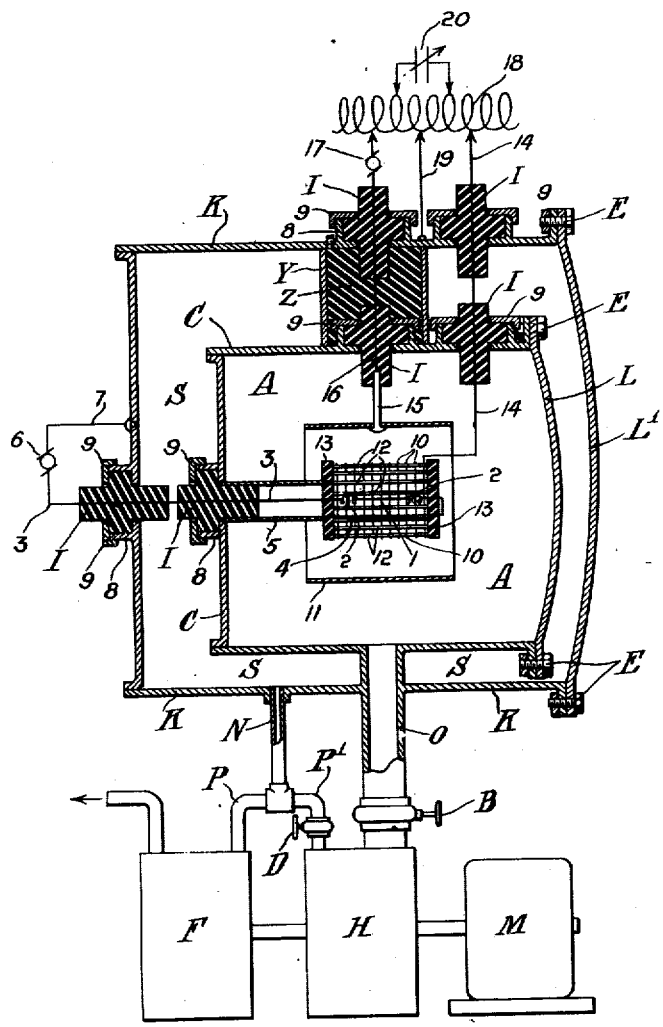
WITNESS
INVENTOR
Greenleaf Whittier Pickard
BY
ATTORNEY Patented Apr. 1, 1924.

1,488,613

UNITED STATES PATENT OFFICE.

GREENLEAF WHITTIER PICKARD, OF NEWTON CENTER, MASSACHUSETTS, ASSIGNOR TO WIRELESS SPECIALTY APPARATUS COMPANY, OF BOSTON, MASSACHUSETTS, A CORPORATION OF NEW YORK.

VACUOUS ELECTRICAL APPARATUS.

Application filed February 28, 1919. Serial No. 279,912.

*To all whom it may concern:*

Be it known that I, GREENLEAF WHITTIER PICKARD, a citizen of the United States of America, and a resident of Newton Center, county of Middlesex, and State of Massachusetts, have invented certain new and useful Improvements in Vacuous Electrical Apparatus, the principles of which are set forth in the following specification and accompanying drawing, which disclose the form of invention which I now consider to be the best of the various forms in which the principles of the invention may be embodied.

This invention relates to vacuous electrical apparatus and consists of improved means for preserving the desired vacuous condition thereof without dependance upon a continuously operating vacuum pump.

The particular class of vacuous electrical apparatus to which the invention relates, includes those devices wherein a plurality (two or more) of electrodes are separated from each other in a more or less vacuous space enclosed by a casing, the electrodes being connected to electrically conducting leads which extend out thru the wall of the casing. Such devices have been variously termed audions, mercury arcs (wherein during operation the enclosed space contains mercury vapor,) kenotrons, thermionic devices, etc., and the like. The invention may be embodied usefully with any of such devices irrespective of the number or separated electrodes and of the degree of vacuum of pressure in the casing.

Generally heretofore the casings for said class of devices have been made of glass which is a material well suited to keep out air and permit an air seal around the outgoing leads, as in the case of incandescent lamps. But as the use of such devices has been extended to higher electric powers, problems have arisen which involve the difficulty of the glass-sealing of leads having very large current-carrying capacity, and also the liability to straining and breakage of the glass by temperature changes incidental to operation at high powers. Consequently attempts have been made to use metal instead of glass for the casings; but these attempts have been unsuccessful because no practical means has been provided to seal the minute passages or air leaks such as those which surround the portions of the leads which extend out thru the metal wall of the casing. A practical means of such sort it is the object of this invention to provide, and the principle underlying the invention whereby leakage is prevented, is that the quantity of gas flowing thru a constricted aperture is directly proportional to the difference in pressure on opposite sides of the aperture.

The drawing illustrates one application of the invention, by way of example, to one form of the above described class of vacuous electrical devices. In the example disclosed, one of the interior electrodes is heated, sometimes to incandescence. The details of this example of the class of devices will be described hereinafter. The invention may be embodied, however, in any other form of such class of vacuous electrical apparatus, including the mercury vapor devices wherein a vacuum exists in the casing before the mercury vapor is liberated therein, in order to permit the preponderance of mercury as an atmosphere.

The electrodes in the example disclosed are shown in the middle of the vacuum casing C, which may be of metal, as sheet steel enclosing vacuous space A. The corner joints of the sheets, as shown, may be sealed as by fusing by the oxy-acetylene torch. An outer casing K encloses a space S which may, as shown, completely surround the inner casing C, the arrangement in any event being such as to have the vacuous space S in communication with leakage openings into inner space A (as along the electrode leads, etc.) and, if desirable, to have space S surround as much as practicable of the walls of the inner casing C itself, as will be described, dependent upon the nature of the material of such walls. The outer casing K, like inner casing C, may be of sheet steel with sealed joints. Of course, even if outer casing K were partially evacuated of air, some air will leak from its space S into space A in the inner casing C, thru the minute apertures surrounding the electrode-leads and the insulators I which insulate the leads from the metal casing; and when this casing C is of metal, which is pervious to air, there will be a more or less slow leak thru the metal itself. The same is true of casing K in respect to the external atmosphere, whether or not a third casing like K be provided for K, just as K is shown as provided for C. Altho the invention may be included in an apparatus which comprises such a third casing (or even a fourth casing, etc.), yet the preferred form is that shown with one enclosing casing K and the co-operating features to be described.

F and H are respectively a fore-pump (a primary or low vacuum pump), and a high vacuum pump (as a Gaede pump), both operated by driver or motor M. As shown these pumps are connected in tandem by the pipe P, P¹, this being not necessary but preferable. Pump H described as of high vacuum (it may evacuate to a hundredth or a thousandth micron or less) is so relatively to pump F, and need not always be of very high vacuum, and need not in all cases be provided or used after the vacuum has been established initially in casing C.

Similarly pump F described as of low vacuum (about 0.5 millimeter) is so relatively to pump H and need not be of very low vacuum, altho its use in connection with outer casing K is very important under any circumstances.

High vacuum pump H is in communication with the interior space A of inner casing C by way of a connection O which, as shown, is advantageously and readily made integral with casings C and K by fusing effected by the oxy-acetylene torch.

Low vacuum pump F is in communication with outer casing K by way of a connection N which may consist of a pipe, as shown, welded to casing K, this lower vacuum pipe N being permissibly of smaller internal diameter than the high vacuum connection O.

The above constitutes a high power installation which is permanent, save for the permissible renewal of the electrodes, especially the incandescent electrode if such a one is used. The inner casing C is provided with a movable head or closure L which may be opened or removed to permit access to the interior of casing C to replace one or more of the electrodes, such as the incandescent electrode if used, or to clean the interior as in the case of a mercury vapor device. Outer casing K also is provided with a movable head or closure L¹ located adjacent inner head or closure L, as shown, to permit access to the latter and to the electrodes inside C. These two closures L and L¹ may be held in place by bolts E, and are suitably gasketed to exclude external air to the greatest possible extent.

The principal function of pumps F and H is to cooperate with outer casing K in maintaining a previously produced vacuous condition in the inner casing C notwithstanding the leakage around the leads and the joints of the movable closure, but the pumps may be operated to establish the initial vacuous condition in both casings C and K after the various parts have been assembled and sealed and prior to the electrical use of the apparatus.

In the lack of outer casing K enclosing the leakage openings around the leads and movable closures of casing C, it would be difficult and in some cases impossible, to maintain the desired degree of vacuum in casing C, even if tandem pumps F and H were continuously operated to remove air from C by connection O; for too much air would leak from the external atmosphere into casing C, chiefly by way of the apertures surrounding the leads and also by way of the joints of closure L, in addition to the slower leaks thru the metal itself of the casing C.

The operation with outer casing K and exhaust connection N will now be described, assuming the desirability of an extremely high vacuum in casing C, altho such a high vacuum is not needed in all apparatus of this class, as, for example, in the mercury arc. Assume the vacuum in C to be a thousandths of a micron. By means of low vacuum pump F, the vacuum in enclosed space S may be made and kept, at say one-half millimeter. Thus the difference in pressure on opposite side of leakage openings into inner casing C is about one-half a millimeter, that is, about fifteen hundred times less than the difference in pressure on opposite sides of the wall of casing C which would exist in the absence of outer casing K. As a result, the leakage into inner casing C, thru the apertures around the leads and the joints in closure L is reduced many fold, the reduction being approximately in the ratio of the reduction of the pressure difference between the inside and outside of inner casing C.

As another example. The various leaks in a vacuous vessel are subjected to a difference of pressure which is approximately that of the external atmosphere itself that is, 760 millimeters. Assuming that the difference in pressure inside and outside of casing C is reduced from that to one millimeter (instead of one-half millimeter as above) then the reduction of leakage is 760 times. Thus, on an average and by practical means, the invention makes it possible to reduce leakage in this type of apparatus approximately a thousand fold.

An important advantage is that the invention permits, includes and makes practicable the movable closures L and L¹ thereby permitting ready access to the electrodes which is a practical desideratum. Metal casings also are ideal for power work, and the invention obviates the sole disadvantage of metal that it is substantially impossible and impracticable to seal electrodes thru such casing in an air-tight manner, and thereby impossible or impracticable to maintain a vacuum even with continued operation of a high vacuum pump.

The invention, by permitting such a high reduction of leakage into inner casing C permits the use of metal casings of any desired size, with any desired number of lead-insulators I which may be of porcelain, fused quartz or any other good insulator.

After the initial vacua have been obtained in spaces A and S, high vacuum pump H need not be operated, at any time, for a long period. It may be cut off by valves B and D, or any other desired arrangement, and in such cases it may not be necessary to use it at all save between very long intervals. In such case, the desired vacuum in space A may be maintained for many hours, days or even weeks, merely by the maintenance of a fair vacuum in space S by the occasional operation of fore-pump F.

If desired, however, both pumps may be operated whenever it is desired to operate either, and if the pumps are operated simultaneously, it is best to operate them in tandem just as they would be used (with fore-pump F aiding pump H) if they were working merely on inner space A. If casing C be a large one or if there be bad leaks into it around the leads or thru the joints of the movable closure L, it may be necessary to operate both pumps continuously, particularly if an extremely high vacuum is desired in space A. But with due care in construction of the casing all that will be necessary under most conditions will be an occasional operation of fore-pump F. In any case, the invention by its enormous reduction of leakage, permits the use of very small pumps, of low cost and requiring small driving power. The invention will also permit the use of an inner casing so extremely leaky as to prevent otherwise the obtaining or maintaining of an operative degree of vacuum.

*Electrodes and leads.*

The particular apparatus disclosed by way of an example of the class in which the invention may be embodied is a so called oscillion or oscillating audion adapted for producing high frequency oscillations of high power for use in long distance radio communication. This device has three electrodes (some others of the class have only two in all) and in this case one of the electrodes, 1, is an incandescent filament. At high powers, considerable heat is developed at this electrode, which makes metal coverings desirable in order to conduct the heat outside as by thermally conducting connections between the two casings, of any desired construction and not forming part of this invention.

Filament 1 may be of tungsten wire. To prevent sagging it is held under slight tension by springs 2, 2. One terminal 3 of filament 1 goes thru insulators I to a terminal of the source 6 of filament-heating current. The other terminal 4 of filament 1 goes to a short metal tube 5 supported in metal casing C thereby closing electrical connection with the other terminal of heating source 6 via casing C, exhaust pipe O and outer casing K to which source 6 is connected by lead 7. The first filament-lead 3 is insulated from metal casings C, K by the insulators I which are constructed with gaskets 8 held under compression by rings 9. It is the unavoidable leaks around these insulators I, etc., and thru the joints of the movable closure L which are compensated for by the invention.

The two electrodes additional to filament 1 are the "grid" electrode consisting of a helix 10 of fine molybdenum wire surrounding filament 1 wound around a cage 12 surrounding filament 1; and the "plate" electrode 11 consisting of a short open-ended cylinder of molybdenum surrounding the helix 10.

The details of the "grid" electrodes are the molybdenum rods 12 forming a cage around filament 1 its ends being supported in the two disks 13 of fused quartz or mica. From the "grid" 10—12 a lead 14 goes thru insulator I to a connection on a coil 18.

The details of the "plate" or outermost electrode 11 are its support 15 consisting of a short molybdenum rod and the insulator I in which said rod is mounted. From rod 15 goes a lead 16 thru the insulator I to a source of potential 17 which may be a direct current generator of several thousand volts. Plate electrode 11 has only the one terminal, connected as just stated. The other terminal of source 17 goes to coil 18.

Thus all the electrodes are separated from each other within the space A in casing C, the electrical action across the space between the electrodes being effected by thermionic or gaseous conduction, as the case may be, depending on the presence of a substantially perfect vacuum or of mercury vapor, rarified air or other gas. etc.

Coil 18 is connected by lead 19 to outer metal casing K to which as described above, current source 6 is connected by lead 7.

A condenser 20 is connected to two points 21 and 22 on coil 18.

If the apparatus be used as a transmitter in radio communication the plates of condenser 20 may be constituted respectively by the ordinary antenna or aerial, wire or wires as one element of the condenser and by the ordinary ground connection or counterpoise of such antenna as the other plate of the condenser. Inasmuch as such antenna and ground are so well known the drawing may be taken as diagrammatically representing the same.

The electrical operation of apparatus connected as above will not be described, as it is well known, and is only one of the specific forms of similar apparatus with which the invention may be embodied.

Space S is not necessarily in all cases under very high vacuum, and hence may contain so many gas molecules as to result in ionization of the gas (as air) by the high potential of lead 16 to plate electrode 11 to such extent as might cause a leak of electricity from said high potential lead. To prevent that I provide an ionization shield Z in space S to separate lead 16 from the air or gas in said space.

This shield Z extends between the two casings C and K so as to surround all the part of lead 16 which extends thru space S. Shield Z may consists of suitable electrically insulating material which may advantageously be any of the well known waxes of high melting point. In such case there may be provided a tube Y to receive the wax as it is poured in in a molten state. This tube if made of metal will serve to connect casings C and K both thermally and electrically, as is done also by that part of exhaust pipe O which connects the two casings; altho it will be understood that in cases of very high power and heat generation at filament 1 it may be desirable to provide additional thermal connections between casings C and K, which may be done with ease by the aid of the oxy-acetylene torch.

I am aware of the proposal in the suggested alternative form of Fig. 5 of the patent to De Forest 1,201,271 to provide a flask or bottle having a stopper sealed by mercury, and an evacuated envelop around the non-stoppered part of the bottle, said envelope containing any desired portion of a vacuum; but the difference between that suggestion and my invention are so clear and important that they will be readily understood in view of the above description and in view of the fact that my invention permits the use of metal casings regardless of leakage which is not excessive, due to the fact that in any given case my invention permits the reduction of leakage a thousand fold.

I claim:

1. The electrical apparatus which comprises a plurality of electrodes; a metallic casing constructed to enclose a vacuous space and within which said electrodes operatively are permanently mounted to be separated from one another by such vacuous space, said casing being provided with a closure which is movable to permit access to said electrodes, and formed with wall openings; electrical leads extending from said electrodes through said wall openings of said casing for connection to outside electrical apparatus with and by virtue of which said electrodes cooperate by conduction across the vacuous space between them; electrical insulation between said leads and metal casing; and an outer casing within which said inner casing is mounted and which is constructed to provide a space which substantially supporting the air-pervious metal wall of the inner casing including said wall openings and leakage openings between the inner casing and its said movable closure, said outer casing being constructed to permit maintenance of a vacuum in the space within it which will reduce the pressure differential between such space and the space between the operating electrodes within the inner casing and thereby reduce leakage to the space around said electrodes.

2. The electrical apparatus which comprises a plurality of electrodes; a metallic casing constructed to enclose a vacuous space and within which said electrodes operatively are permanently mounted to be separated from one another by such vacuous space; said casing being provided with a closure which is movable to permit access to said electrodes, and formed with wall openings; electrical leads extending from said electrodes through said wall openings of said casing for connection to outside electrical apparatus with and by virtue of which said electrodes co-operate by conduction across the vacuous space between them; and an outer casing within which said inner casing is mounted and which is constructed to provide a space which substantially surrounds the air-pervious metal walls of the inner casing, including said wall openings and leakage openings between the inner casing and the said movable closure; said outer casing being constructed to permit maintenance of a vacuum in the space within it which will reduce the pressure differential between such space and the space between the operating electrodes within the inner casing and thereby reduce leakage to the space around said electrodes.

3. The electrical apparatus which comprises a plurality of electrodes; a metallic casing constructed to enclose a vacuous space and within which said electrodes operatively are permanently mounted to be separated from one another by such vacuous space, said casing being constructed with a movable closure to permit access to said electrodes and formed with wall openings; electrical leads extending from said electrodes through said wall openings of said casing for connection to outside electrical apparatus with and by virtue of which said electrodes co-operate by conduction across the vacuous space between them; and an outer casing within which said inner casing is mounted and which is constructed with a closure which is movable and arranged to permit access to said movable closure of the inner casing, said outer casing being constructed to provide a space which substantially surrounds the air-pervious metal walls of the inner casing, including said wall openings and leakage openings between the inner casing and its said movable closure, said outer casing being constructed to permit maintenance of a vacuum in the space within it which will reduce the pressure differential between such space and the space between the operating electrodes within the inner casing and thereby reduce leakage to the space around said electrodes.

4. The electrical apparatus which comprises a plurality of electrodes; a metallic casing constructed to enclose a vacuous space and within which said electrodes operatively are permanently mounted to be separated from one another by such vacuous space; said casing being constructed with a closure which is movable to permit access to said electrodes, and formed with wall openings; electrical leads extending from said electrodes through said wall openings of said casing for connection to outside electrical apparatus with and by virtue of which said electrodes co-operate by conduction across the vacuous space between them; and an outer casing within which said inner casing is mounted and which is constructed to provide a space which substantially surrounds the air-pervious metal wall of the inner casing including said wall openings and leakage openings between the inner casing and its said movable closure, said outer casing being constructed to permit maintenance of a vacuum in the space within it and connected with a vacuum pump in order to reduce the pressure differential between said space and the operating space between the electrodes within the inner casing and thereby reduce leakage to said electrodes.

5. The electrical apparatus which comprises a plurality of electrodes; a metallic casing constructed to enclose a vacuous space and within which said electrodes operatively are permanently mounted to be separated from one another by such vacuous space, said casing being constructed with a closure which is movable to provide access to said electrodes, and with wall openings; electrical leads extending from said electrodes through said wall openings for connection to outside electrical apparatus co-operating with the electrodes; and an outer casing within which said inner casing is mounted and which is constructed to provide a space which substantially surrounds the air-pervious metal walls of the inner casing including said wall openings and leakage openings between the inner casing and its said movable closure, said outer casing being constructed to permit maintenance of a vacuum in the space within it which will reduce the pressure differential between such space and the space between the operating electrodes within the inner casing and thereby reduce leakage to the space around said electrodes.

6. The electrical apparatus which comprises a plurality of electrodes; a metallic casing constructed to enclose a vacuous space and within which said electrodes operatively are permanently mounted to be separated from one another by such vacuous space, said casing being constructed with a closure which is movable to provide access to said electrodes and with wall openings, for electrical leads extending from said electrodes through said wall opening for connection to outside electrical apparatus co-operating with said electrodes, and an outer casing within which said inner casing is mounted and which is constructed to provide a space which substantially surrounds the air-pervious metal walls of the inner casing including said wall openings, and leakage openings between said inner casing and its movable closure, said outer casing being constructed to permit maintenance of a vacuum in the space within it which will reduce the pressure differential between such space and the space between the operating electrodes within the inner casing and thereby reduce leakage to the space around said electrodes; and said outer casing being constructed with a movable closure adjacent to the movable closure of the inner casing.

7. The electrical apparatus which comprises a plurality of electrodes; a metallic casing constructed to enclose a vacuous space and within which said electrodes operatively are permanently mounted to be separated from one another by such vacuous space, said casing having wall openings for electrical leads from said electrodes for connection to outside electrical apparatus co-operating with the electrodes; an outer casing constructed to permit the maintenance of a vacuum in the space within it and within which said inner casing is mounted and which is constructed to provide a space which surrounds the wall openings in said inner casing and substantially surrounds the air-pervious metal walls of the inner casing; and a high vacuum pump and a fore pump connected in tandem with one another and in communication respectively with the space outside the inner casing and with the inner operating space between the electrodes within the inner casing and provided with a common driving means for both pumps and with means for cutting off the high vacuum pump from the fore pump and from the operating space between the electrodes.

8. The electrical apparatus which comprises a plurality of electrodes; a metallic casing constructed to enclose a vacuous space and within which said electrodes operatively are permanently mounted to be separated from one another by such vacuous space, said casing having a movable closure to permit access to said electrodes and having wall openings; electrical leads extending from said electrodes through said openings for connection to outside electrical apparatus co-operating with said electrodes; an outer metallic casing having a movable closure adjacent to the movable closure of the inner metallic casing and constructed with wall openings for said electrodes and to permit the maintenance of a vacuum in the space within it and within which said inner casing is mounted and which is constructed to provide a space which substantially surrounds the air-pervious metal walls of the inner casing, including said wall openings of the inner casing, and leakage openings between the inner casing and its said movable closure; and a low vacuum pump connected with the space within the outer casing to maintain a vacuum therein and reduce the pressure differential between such space and the operating space between the electrodes within the inner casing and thereby reduce leakage to said electrodes.

9. The electrical apparatus which comprises a plurality of electrodes; a casing constructed to enclose a vacuous space and within which said electrodes operatively are permanently mounted to be separated from one another by such vacuous space, said casing being constructed with a movable closure and wall openings; for electrical leads extending from said electrodes through said wall openings for connection to outside electrical apparatus co-operating with said electrodes; and an outer casing within which said inner casing is mounted and which is constructed to provide a space which surrounds the movable closure and wall openings of said inner casing, said outer casing being constructed to permit maintenance of a vacuum in the space within it which will reduce the pressure differential between such space and the space between the operating electrodes within the inner casing, and thereby reduce leakage to the space around said electrodes.

10. The electrical apparatus which comprises a plurality of electrodes; a casing constructed of material slightly pervious to air but to enclose a vacuous space and within which casing said electrodes operatively are permanently mounted to be separated from one another by such vacuous space, said casing being constructed with a movable closure and wall openings; electrical leads extending from said electrodes through said wall openings for connection to outside electrical apparatus co-operating with the electrodes; and an outer casing within which said inner casing is mounted and which is constructed to provide a space which surrounds the movable closure and wall openings of said inner casing and which also substantially surrounds the walls of the inner casing itself, said outer casing being constructed to permit maintenance of a vacuum in the space within it which will reduce the pressure differential between such space and the space between the operating electrodes within the inner casing and thereby reduce leakage to the space around said electrodes.

11. An electrical apparatus comprising a plurality of electrodes separated from each other inside a vacuous casing and connected to leads extending out thru the casing, a second vacuous casing enclosing a space surrounding leakage openings which surround these portions of the leads which extend out thru the first vacuous casing; said leads extending also thru said space and out thru said enclosing casing; and an ionization shield in said enclosed space and surrounding that portion of one of the leads which extends thru said space.

GREENLEAF WHITTIER PICKARD.

Witnesses:
JOHN L. WARREN,
JAMES J. McGOVERN.

Certificate of Correction.

It is hereby certified that in Letters Patent No. 1,488,613, granted April 1, 1924, upon the application of Greenleaf Whittier Pickard, of Newton Center, Massachusetts, for an improvement in "Vacuous Electrical Apparatus," an error appears in the printed specification requiring correction as follows: Page 4, line 77, claim 1, for the word "supporting" read *surrounds;* and that the said Letters Patent should be read with this correction therein that the same may conform to the record of the case in the Patent Office.

Signed and sealed this 6th day of May, A. D. 1924.

[SEAL.]

KARL FENNING,
*Acting Commissioner of Patents.*